(12) United States Patent
Freeman

(10) Patent No.: US 6,308,266 B1
(45) Date of Patent: Oct. 23, 2001

(54) SYSTEM AND METHOD FOR ENABLING DIFFERENT GRADES OF CRYPTOGRAPHY STRENGTH IN A PRODUCT

(75) Inventor: Trevor W. Freeman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/036,002

(22) Filed: Mar. 4, 1998

(51) Int. Cl.⁷ .......................................................... G06F 1/24
(52) U.S. Cl. .......................... 713/156; 713/159; 713/161; 713/172; 713/175
(58) Field of Search .................................. 380/45; 705/78, 705/80; 713/100, 152, 157, 158, 159, 166, 191, 155, 156

(56) References Cited

U.S. PATENT DOCUMENTS

| | | | |
|---|---|---|---|
| 4,918,728 | * | 4/1990 | Matyas et al. ........................ 380/21 |
| 4,941,176 | * | 7/1990 | Matyas et al. ........................ 380/21 |
| 5,073,934 | * | 12/1991 | Matyas et al. ........................ 380/25 |
| 5,200,999 | * | 4/1993 | Matyas et al. ........................ 380/25 |
| 5,323,464 | * | 6/1994 | Elander et al. ....................... 713/191 |
| 5,432,849 | * | 7/1995 | Johnson et al. ...................... 380/280 |
| 5,555,309 | * | 9/1996 | Kruys .................................... 380/280 |
| 5,651,068 | * | 7/1997 | Klemba et al. ....................... 713/159 |
| 5,710,814 | * | 1/1998 | Klemba et al. ....................... 713/173 |
| 5,841,870 | * | 11/1998 | Fieres et al. ........................ 713/156 |

OTHER PUBLICATIONS

Sean Smith and Steve Weingart, IBM Research Report— Building a High–Performance, Programmable Secure Coprocessor, Feb. 19, 1998.*

Microsoft, Server Gated Cryptography, Apr. 13, 1998.*

IBM, OS/390 Integrated Cryptographic Service Facility— Overview Version 2 Release Mar. 5, 1998.*

ITU–T Recommendation X.509.*

* cited by examiner

Primary Examiner—Thomas R. Peeso
(74) Attorney, Agent, or Firm—Lee & Hayes, PLLC

(57) ABSTRACT

A single cryptographically enhanced product is capable of exposing various strengths of cryptography. When first installed, the product exposes only a low-level, exportable strength cryptography that may be used in both the U.S. or overseas with a general export license. Stronger cryptography is implemented in the product, but is not exposed to the user. To enable the stronger cryptography, the user must obtain an authorization certificate issued from a certifying authority. The authorization certificate contains an identity of the certifying authority and a token granted by the product's provider. The token contains capabilities to expose the stronger cryptography in the product and an encoded ID of the certifying authority, which binds the token to a specific certifying authority. The cryptographic product evaluates the authorization certificate and token to verify that the certificate is from the certifying authority, the token is from the product provider, and the token contains the hash digest of the certifying authority. The product also determines whether the certificate or token has been revoked or has expired. If everything checks out, the product uses the capabilities included in the token to expose the higher strength cryptography to the user; otherwise, the product denies the request for higher strength cryptography and continues to use only the low strength cryptography.

40 Claims, 7 Drawing Sheets

SYSTEM AND METHOD FOR ENABLING DIFFERENT GRADES OF CRYPTOGRAPHY STRENGTH IN A PRODUCT

TECHNICAL FIELD

This invention relates to products that employ cryptographic functionality. More particularly, this invention relates to an architecture that enables a user of such products to enable various grades of cryptography strength in those products.

BACKGROUND

Cryptographic ciphers are often measured and described in terms of their strength. Different ciphers offer different strength depending on how hard they are to break. "Strong" ciphers are more difficult to break than "weak" ciphers. Different types of data lend themselves to different strengths of cryptography. For instance, if the cost required to break a cipher is greater than the value of the protected data, that particular cipher is most likely appropriate for the data even though the cipher may be relatively weak compared to other ciphers. If the time required to break a cipher is longer than the time needed to keep the protected data secret, the cipher is properly suited for the data.

In public key cryptography, the cipher typically derives its strength from the length of the key used to encode the data. A "key" is a string of bits and its "length" is expressed in the number of bits in the string. The same cipher can be weak or strong depending upon the key length. A cipher with a comparatively short key length (e.g., 40 or 56 bits) may be considered weak, whereas the same cipher with a comparatively long key length (e.g., 128 bits) may be deemed strong. It is common today for various software products to employ ciphers with 40-bit or 56-bit keys, which are generally characterized as weak, as well as ciphers that employ 128-bit keys, which are generally considered to be strong.

Because of their potential for illegal or improper use, cryptographic ciphers cannot be exported from the United States without approval from the U.S. government. Generally, products with "weak" ciphers having short key length may be exported. Such products are said to have "exportable strength" cryptographic functionality. Products with "strong" ciphers having long key lengths are usually not permitted to leave the country. To export a cryptographic product from the U.S., the product manufacturer or exporter must first obtain an export license from the U.S. government.

As a result of this government policy, the makers of cryptographically enhanced products face a dilemma. They would like to make a single product that can be sold in the U.S. and exported abroad without the hassle of securing special export licenses for each and every foreign market.

FIG. 1 illustrates this point. A cryptographic product provider 10 makes a single product 12 that utilizes cryptographic services, such as encryption, decryption, digital signing, and authentication. To enable global exportation to Europe and Asia without having to secure special export licenses, the provider 10 typically configures the product with a weak "exportable-strength" cipher. As a result, the U.S. version of the product is likewise pared down to the lowest exportable-strength cipher. However, some U.S. customers might request and be entitled to use higher strength ciphers. Such customers must submit special requests to the provider, along with proof of residence and proposed use, before the provider 10 can release a stronger version of the product.

Accordingly, there is a need to provide an improved technique for supplying cryptographically enhanced products throughout the world.

SUMMARY

This invention concerns an architecture that selectively exposes various grades of cryptographic strength in the same product. A product provider manufactures one cryptographically enhanced product that can be marketed to users in the U.S. and exported to users abroad. Once installed, the product initially exposes only a low-level, exportable-strength cryptography that may be used in both the U.S. or overseas with a general export license. Stronger cryptography is implemented in the product, but is not exposed to the user. It is also not required to expose by default all algorithms supported by the cryptographic product. It is possible to use this same mechanism to only expose the existence of an algorithm when authorized to do so.

To enable the stronger cryptography with the product, the user must first obtain a certificate that contains the capabilities to expose the stronger cryptography in the product. The certificate is issued to the user from a certifying authority. The certifying authority, in turn, obtains the enabling capabilities from the product provider. The process of requesting and receiving the certificate enables the product provider to ensure that the certifying authority, and ultimately the user, is legally able to employ the stronger cryptography in the product.

According to one implementation, the certifying authority submits a request to the product provider for higher strength cryptography. The request contains an identity certificate that uniquely identifies the certifying authority. The product provider authenticates the identity certificate and verifies whether the certifying authority can use higher strength cryptography. The product provider may evaluate such policy considerations as where the certifying authority resides, to whom the certifying authority intends to issue certificate, and the purpose for which the enhanced strength product is to be used. If the policy considerations are met, the product provider creates a token that contains the capabilities to enable the higher strength cryptography within the product. The token should have a means of verifying the integrity of the token such as a digital signature to ensure that any attempt to alter the token can be detected. The token also contains a hash digest of the identity certificate, thereby binding the certifying authority to the enabling token.

When the user desires higher strength cryptography, the user submits a request to the certifying authority for the higher strength cryptography. The request contains the user's public key. The certifying authority authenticates the user and determines whether the user can use the higher strength cryptography. The certifying authority may have its own set of policy considerations such as where the user is located, the purpose for using the higher strength cryptography, and so on. If the policy parameters are satisfied, the certifying authority creates a certificate that contains the certifying authority identity and the signed token issued by the product provider. The certifying authority returns the certificate with the signed token to the user, where it is stored locally on the user's computer.

When the user desires the extra strength cryptography from the product, the certificate containing the signed token is passed into the product. The cryptographic product evaluates the certificate and signed token in several ways. First, the product verifies that the certificate is truly from the certifying authority. Second, the product verifies that the signed token is truly from the product provider. Third, the product ensures that the signed token contains the hash digest of the certifying authority, thereby linking the certifying authority with the product provider. Fourth, the product determines whether the certificate or signed token has expired. Fifth, the product determines whether the certificate or token has been revoked.

If all verification steps return true, the product uses the capabilities included in the signed token to expose the higher strength cryptography to the user. On the other hand, if any step returns false, the product denies the request for higher strength cryptography and continues to use only the low strength cryptography.

BRIEF DESCRIPTION OF THE DRAWINGS

The same reference numerals are used throughout the drawings to reference like features and components.

DETAILED DESCRIPTION

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or a second edition with copyright 1996), which is hereby incorporated by reference.

General Architecture

Figure 2:
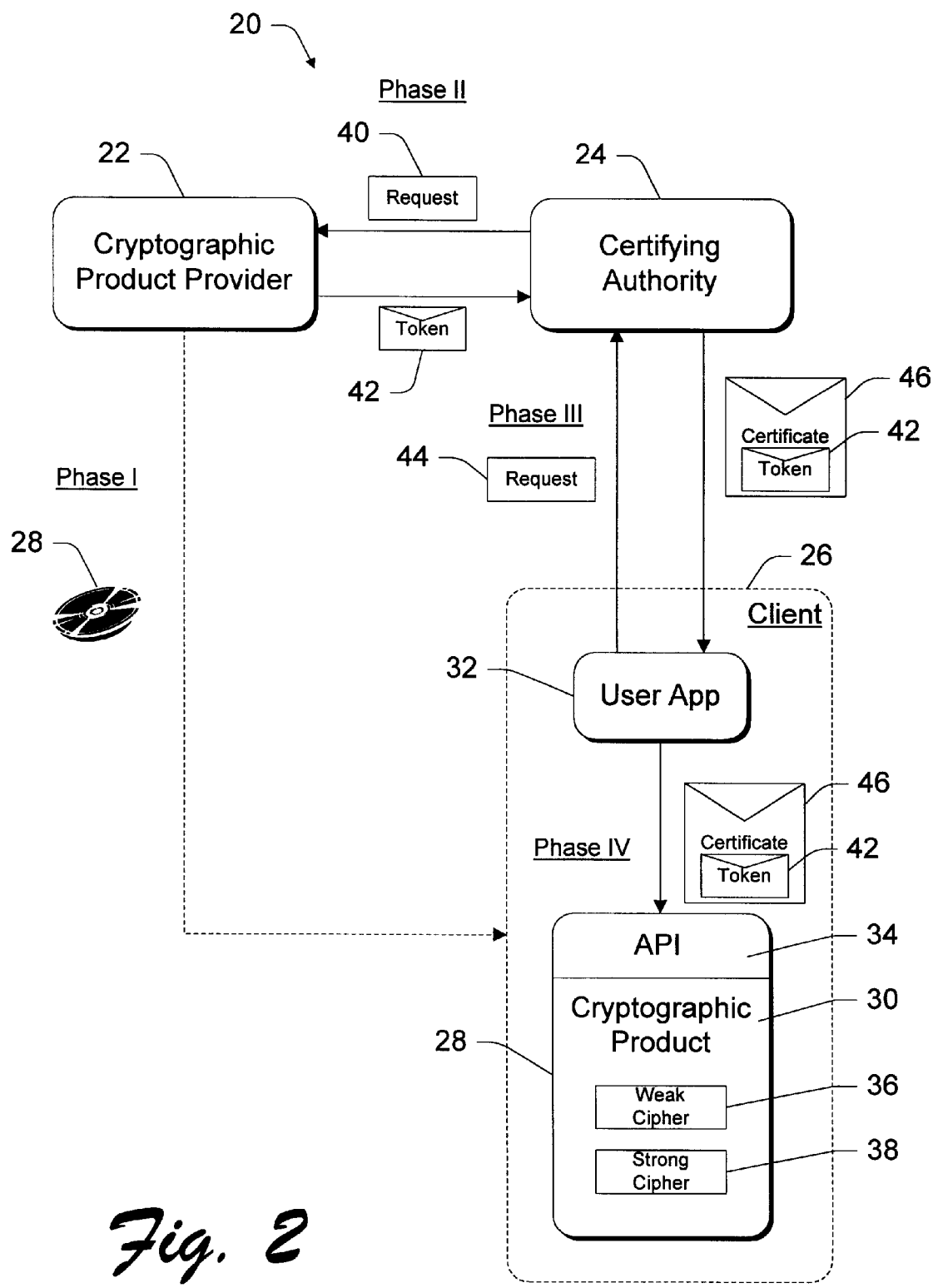
FIG. 2 is a diagrammatic illustration of a system for enabling different grades of cryptography strength in a product.

FIG. 2 shows a system 20 for providing a cryptographic-based product that is capable of employing varying grades of cryptographic strength. The system 20 involves three primary participants: a cryptographic product provider 22, a certifying authority 24, and a user's client 26. The cryptographic product provider 22 may be the manufacturer and/or the distributor of the product. Alternatively, the product provider 22 might be a third party that is authorized to enable various grades of cryptographic strength in the product.

The cryptographic-based product may be implemented in a number of forms. The product may be implemented as a computer application program that is stored at the client 26 and executed on the client processor. Examples of application-level products include online banking application programs, online trading application programs, electronic commerce application programs, and email application programs.

The cryptographic-based product may alternatively be implemented as a service layer. For instance, the product might comprise a set of one or more DLLs (dynamic link libraries) that provide cryptographic services to application programs via a set of APIs (application program interfaces). One specific example of a service layer product is the cryptographic service providers (CSPs) developed by Microsoft Corporation. The CSPs perform cryptography functions and manage cryptographic keys used in the functions. For instance, one or more CSPs are configured to perform encryption, decryption, digital signing, and verification functions using certain types of cryptographic algorithms and keys. The CSPs are implemented as dynamic linked libraries (DLLs) that are loaded on demand by a cryptographic application program interface (CAPI) and called by the application through the CAPI. The CSP and CAPI architecture is described in more detail in U.S. Pat. No. 5,689,565, entitled "Cryptography System and Method for Providing Cryptographic Services for a Computer Application", which issued Nov. 18, 1997, and is assigned to Microsoft Corporation. This patent is incorporated by reference.

It is further noted that the cryptographic-based product can be implemented in forms other than software programs and modules. Alternative product implementations include firmware embedded in memory, or a hardware component (e.g., modem), or some other tool that utilizes cryptographic ciphers or services of some kind.

The system 20 distributes and enables the cryptographic strength according to a four-phase process. At phase I, the cryptographic product provider 22 supplies the cryptographic-based product 28 to one or more clients 26. For purposes of continuing discussion, the product is a cryptographically enhanced software program, as represented by a computer disk 28. In this example, the software product 28 is loaded on the client computer as a cryptographic service layer 30 that is exposed to user applications 32 via a set of APIs 34.

In phase I, the product 28 is configured to expose a low grade, exportable-strength cipher 36 having, for example, a weak key length of 40 bits or 56 bits. One or more higher strength ciphers 38 (e.g., 128-bit) are also implemented into the product, but are not exposed to the user at this point. When the user application 32 calls for a cryptographic service 30 via the API 34, it is handed a handle to the weak cipher 36. The user application 32 is not permitted to access the strong cipher 38.

To enable the strong cipher 38, the client 26 first obtains a certificate to use higher strength cryptography in the cryptographic product. The certificate links an authorization to use higher strength cryptography with an identity of the particular certifying authority that is authorized to issue such certificates to the user. Phases II to IV implement the certification process.

At phase II, the certifying authority 24 (or "CA") submits a request 40 to the cryptographic product provider 22 (or "CPP") seeking the capabilities to enable the higher strength cipher 38. The certifying authority 24 might be a bank, or a company, or an association, or a specially dedicated entity whose sole purpose is to grant certificates. The cryptographic product provider 22 examines the request and verifies that the certifying authority 24 is authentic and is able to legitimately use the higher strength cipher. If the request is proper, the cryptographic product provider 22 supplies a digitally signed token 42 to the certifying authority 24 that contains the enabling capabilities. The signed token 42 also contains an encoded identity of the certifying authority 24, thereby binding the token to the specific certifying authority. The token 42 can be traced to the cryptographic product provider 22.

At phase III, the client 26 submits a request 44 to the certifying authority 24 seeking permission to enable the higher strength cipher 38. The certifying authority 24 examines the request and verifies that the client 26 is authentic and is able to legitimately use the higher strength cipher. If the request is proper, the certifying authority 24 issues a certificate 46 that contains the token 42, thereby binding together the CA-issued certificate 46 with the CPP-issued token 42. The certificate 46 is signed by the certifying authority and hence can be traced to the certifying authority. The client 26 stores the certificate with embedded token in local memory. The certificate and token provide chains of authority that enable the client to trace them back to their issuers, the product provider 22 and certifying authority 24.

At phase IV, a user application 32 executing at the client 26 calls via the API 34 to use the strong cipher 38. The application 32 passes the certificate 46 with embedded token 42 to the cryptographic services 30. The service layer 30 examines the certificate 46 and verifies that it originated from the certifying authority 24 and has not been subsequently altered. The service layer 30 also examines the token 42 and verifies that it originated from the cryptographic product provider 22 and has not been subsequently altered. The service layer 30 further checks whether the token 42 contains an encoded identity of the certifying authority 24. When these checks return true, the service layer 30 enables the strong cipher 38. On the other hand, if any one check returns false, the service layer 30 denies the request for stronger cryptographic functionality.

A more detailed description of one implementation of the four-phase process is described below with reference to FIGS. 4–7. Prior to describing this detailed method, however, the following section describes a general-purpose computer that can be used to implement the participants in the system 20.

Exemplary Computer Used to Implement Participants

The cryptographic product provider 22 and certifying authority 24 are preferably implemented as computer servers, such as Windows NT servers that run the Windows NT server operating system from Microsoft Corporation or UNIX-based servers. It is noted, however, that the cryptographic product provider 22 and certifying authority 24 may be implemented using other technologies, including mainframe technologies. The client 26 can be implemented as many different kinds of computers, including a desktop personal computer, a workstation, a laptop computer, a notebook computer, a handheld PC, and so forth.

Figure 3:
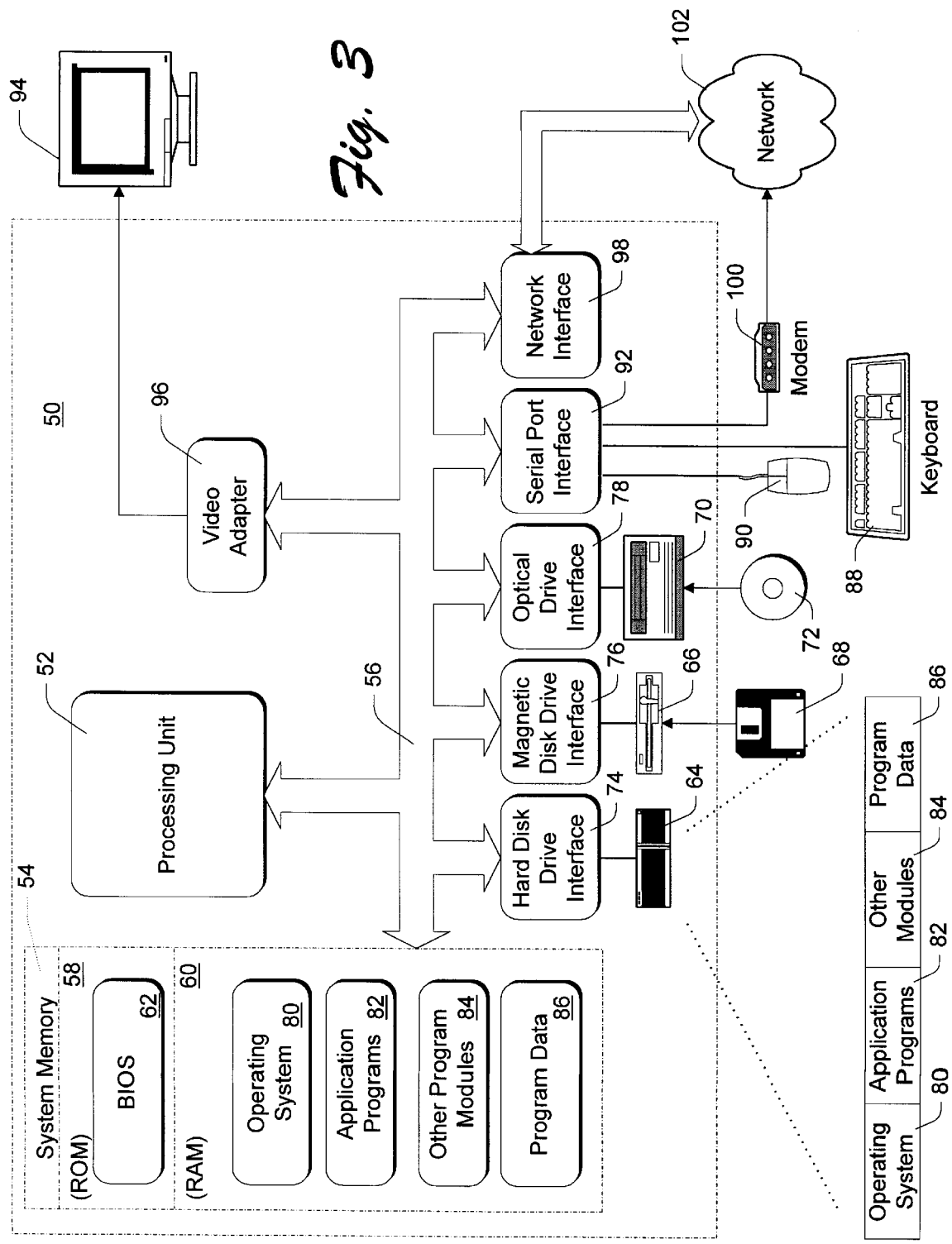
FIG. 3 is a block diagram of a computer that can be used to implement various participants in the system.

FIG. 3 shows an example implementation of a computer 50, which can be used to implement the cryptographic product provider 22, the certifying authority 24, and the client 26. The computer 50 includes a processing unit 52, a system memory 54, and a system bus 56 that interconnects various system components, including the system memory 54 to the processing unit 52. The system bus 56 may be implemented as any one of several bus structures and using any of a variety of bus architectures, including a memory bus or memory controller, a peripheral bus, and a local bus.

The system memory 54 includes read only memory (ROM) 58 and random access memory (RAM) 60. A basic input/output system 62 (BIOS) is stored in ROM 58.

The computer 50 has one or more of the following drives: a hard disk drive 64 for reading from and writing to a hard disk or hard disk array, a magnetic disk drive 66 for reading from or writing to a removable magnetic disk 68, and an optical disk drive 70 for reading from or writing to a removable optical disk 72 such as a CD ROM or other optical media. The hard disk drive 64, magnetic disk drive 66, and optical disk drive 70 are connected to the system bus 56 by a hard disk drive interface 74, a magnetic disk drive interface 76, and an optical drive interface 78, respectively. The drives and their associated computer-readable media provide nonvolatile storage of computer readable instructions, data structures, program modules and other data for the computer 50.

Although a hard disk, a removable magnetic disk 68, and a removable optical disk 72 are described, other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 68, optical disk 72, ROM 58, or RAM 60. These programs include a server operating system 80, one or more application programs 82, other program modules 84, and program data 86. The operating system 80 is preferably a Windows-brand operating system such as Windows NT, Windows 95, Windows CE or other form of Windows. The operating system 80 may alternatively be other types, including UNIX-based operating systems.

A user may enter commands and information into the computer 50 through input devices such as a keyboard 88 and a mouse 90. Other input devices (not shown) may include a microphone, joystick, game pad, satellite dish, scanner, or the like. These and other input devices are connected to the processing unit 52 through a serial port interface 92 that is coupled to the system bus 56, but may alternatively be connected by other interfaces, such as a parallel port, game port, or a universal serial bus (USB).

A monitor 94 or other type of display device is also connected to the system bus 56 via an interface, such as a video adapter 96. The computer 50 has a network interface or adapter 98, a modem 100, or other means for establishing communications over a network 102.

It is noted that the system may be implemented using computing devices other than general purpose computers, such as a point-of-sale machine or kiosk that is employed by merchants, or an automatic teller machine (ATM) used by banks, or a computerized vending machine, or an electronic ticket apparatus, or a set-top box. There are many different forms that the computer 50 might assume.

Phase I: Supply Product

Figure 1:
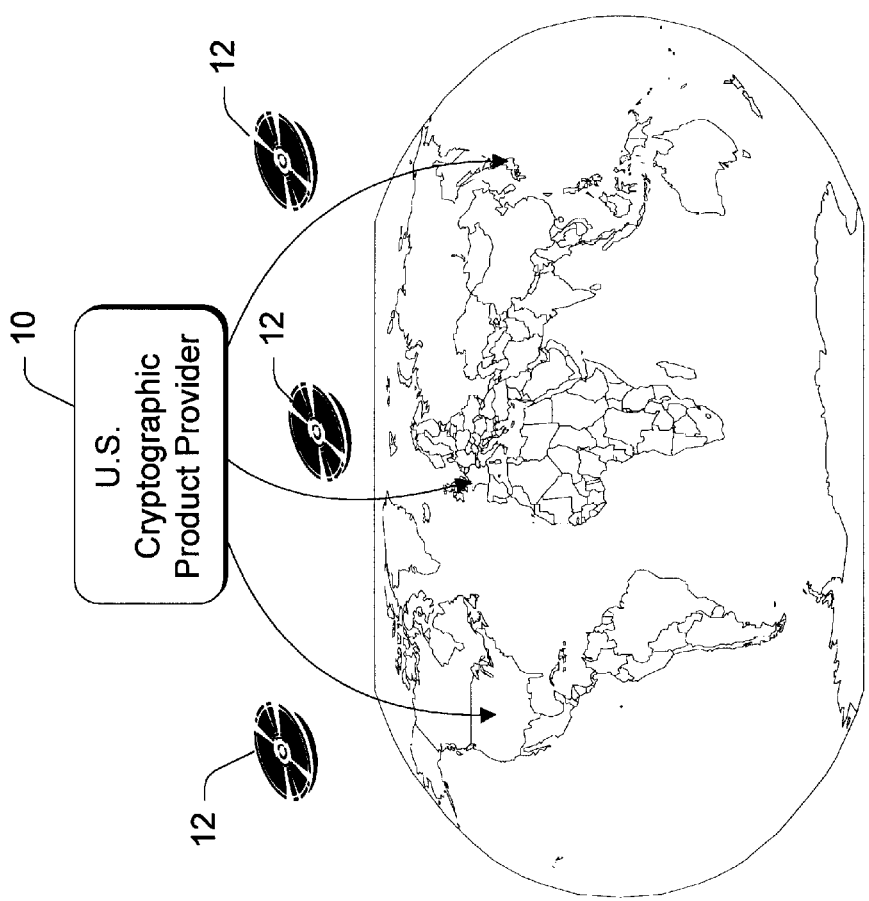
FIG. 1 is a diagrammatic illustration of a conventional distribution setting in which a cryptographic product provider distributes a cryptographically enhanced product throughout the world.
Figure 4:
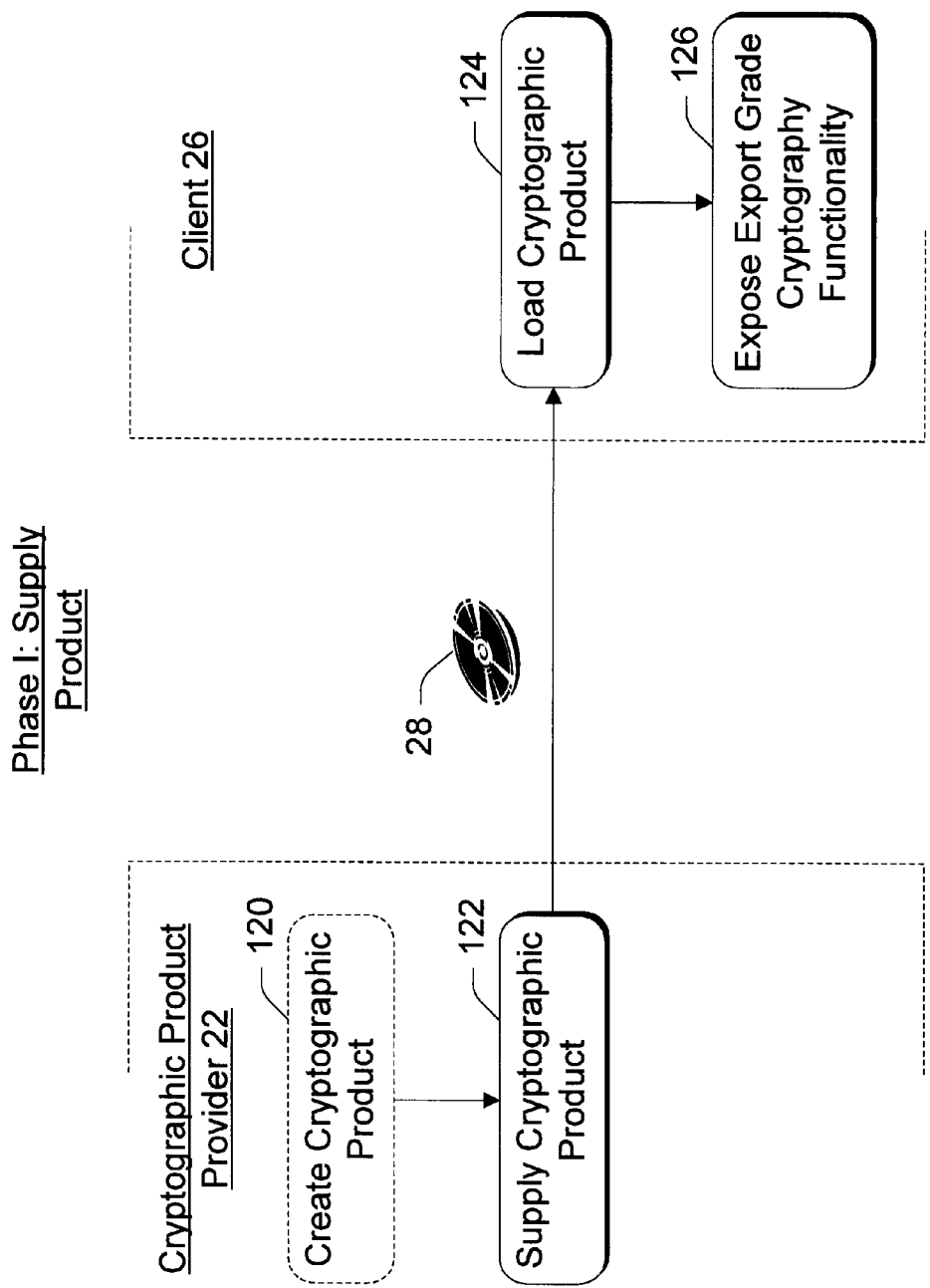
FIG. 4 is a flow diagram showing steps in a method for supplying a product that is capable of having varying grades of cryptographic strength.

FIG. 4 shows steps in a method for supplying a cryptographic product that is capable of employing varying grades of cryptography strength. This method is described with continuing reference to the system 20 shown in FIG. 1.

At step 120 in FIG. 4, the cryptographic product provider 22 creates the cryptographic-based product with varying grades of cryptographic functionality. The product is configured to expose exportable-strength cryptography functionality. Higher strength cryptography is also implemented in the product, but securely hidden within the product. The higher strength cryptography can be exposed only through capabilities granted by the cryptographic product provider 22. These capabilities might be implemented, for example, as a digital key used to unlock a signing algorithm to permit access to the higher strength cryptography. The first step 120 is optional (and hence illustrated as a dashed box) in that it assumes the product provider 22 is also the manufacturer. In situations where the product provider is not the manufacturer, step 120 may be omitted.

At step 122, the cryptographic product provider 22 supplies the product 28 to the client 26. The product may be transferred a number of different ways. For instance, the product may be embodied on a physical memory disk that is sent through the mail or purchased by the user as a shrink-wrapped product from a retailer. Alternatively, the product provider 22 may download the product electronically over a network, such as the Internet, to the client 26.

At step 124, the client 26 loads the cryptographic product into the computer for execution. Once loaded, the product initially exposes the export grade cryptography functionality (step 126 in FIG. 4). In our example, the product initially exposes the weak cipher 36, while keeping the strong cipher 38 securely hidden.

Because the product only exposes exportable grade strength, the product provider 22 can distribute the same product in the United States and abroad with a general export license from the U.S. government. The product provider 22 does not need to obtain a special export license because the higher strength cryptography cannot be exposed without the enabling capabilities supplied by the product provider.

Phase II: Registration

Figure 5:
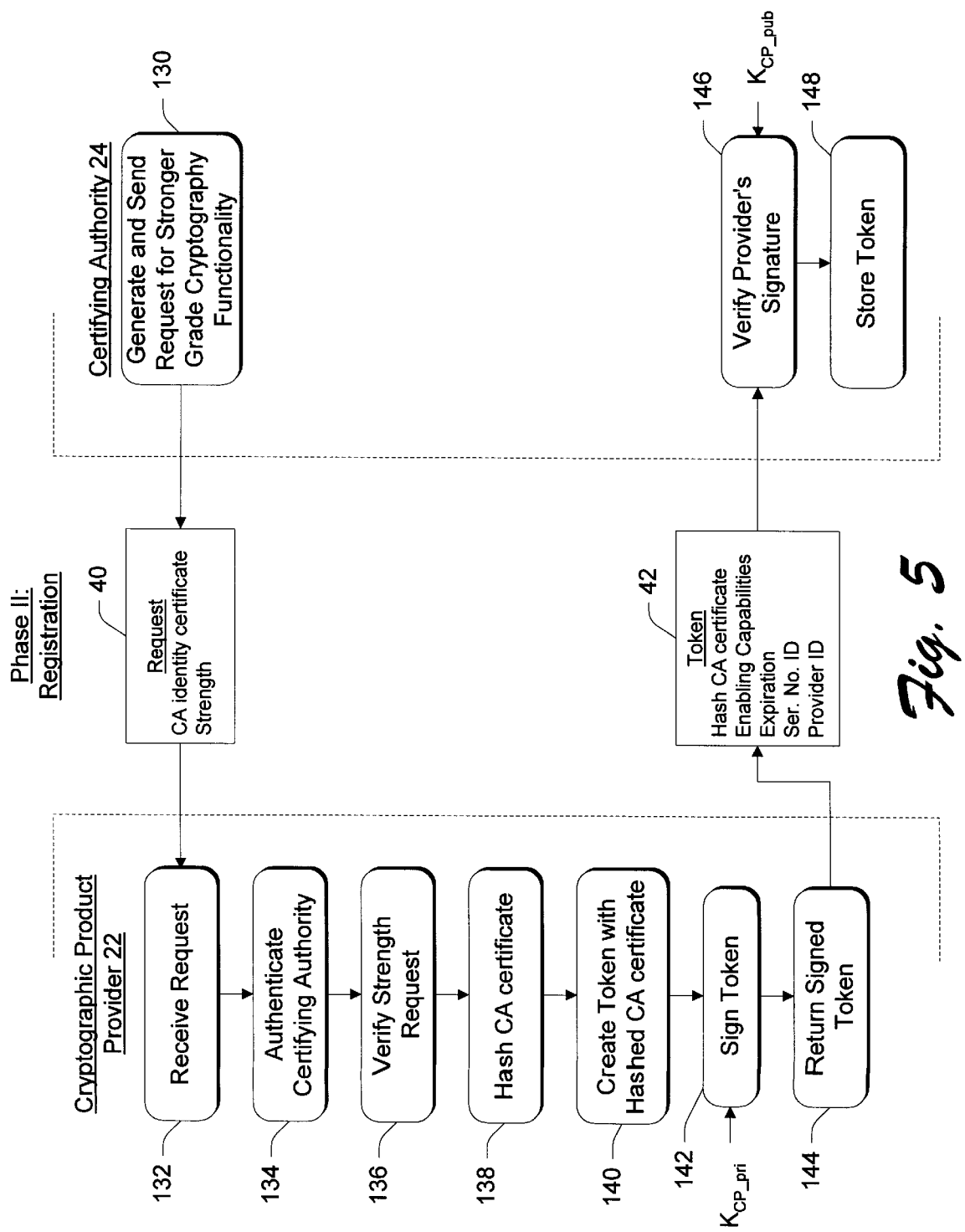
FIG. 5 is a flow diagram showing steps in a method for registering for capabilities to expose stronger cryptography in the product.

FIG. 5 shows steps in a method for registering with the cryptographic product provider 22 to receive capabilities for enabling higher strength cryptography. Most of the steps are implemented in software executing at servers resident at the cryptographic product provider 22 and the certifying authority 24.

At step 130, the certifying authority 24 generates and sends a request 40 for stronger grade cryptographic functionality. The request 40 contains an identity certificate that uniquely identifies the certifying authority 24. The CA identity certificate includes the certifying authority's public key, a serial number, and other data pertaining to the identity and residence of the certifying authority. The request 40 further includes the strength of cryptography being sought (e.g., 128-bit). The request might also include any necessary export licenses or foreign government clearances that demonstrate the CA's authority to use the higher strength cryptography in the U.S. or abroad.

The request may be transferred to the product provider electronically over a network, or hand-carried or mailed on a disk. If the request 40 is transferred over a public network (e.g., Internet), the certifying authority may further encrypt the request using a public key encryption algorithm, such as RSA.

The cryptographic product provider 22 receives the request (step 132 in FIG. 5) and authenticates the certifying authority using the certificate contained in the request 40 (step 134). The product provider verifies that the certifying authority is a legitimate entity, that it exists at the location it stipulates, that it has a legitimate purpose for using the high strength cryptography, and so forth. As part of this process, the product provider also verifies that the certifying authority resides within the United States or has an export license in a country that permits use of extra strength cryptography, and hence is legally capable of utilizing the stronger cryptography (step 136).

At step 138, the product provider 22 computes a hash digest of the CA identity certificate using a one-way hashing function H, as follows:

$$\text{Hash Digest} = H(CA \text{ identity certificate}).$$

At step 140, the cryptographic product provider 22 creates a signed token 42 that contains the hash digest of the CA identity certificate. The token can be implemented as a certificate, such as an X.509 certificate. Table 1 shows the structure of the signed token 42 when implemented as an X.509 certificate.

TABLE 1

Token Structure

| Field | Function |
|---|---|
| Version | Identifies the certificate format. |
| Serial Number | Unique identifier assigned to certificate. |
| Algorithm ID | Identifies the type of algorithm used to sign the certificate, together with any parameters. |
| Issuer | Name of the cryptographic product provider. |
| Period of Validity | Specifies a pair of dates, between which the certificate is valid. |
| Subject | Name of the certifying authority. |
| Subject's Public Key | Specifies a cryptography algorithm, parameters used in the algorithm, and the subject's public key (i.e., the certifying authority's public key). |
| Signature | Signature of issuer, which in this case is the cryptographic product provider. |
| Extension | Holds additional data and information that an issuer may wish to include, or a subject may wish to have included, as part of the certificate. In this example, the extension field is used to hold the hash digest of the CA's identity certificate, the capabilities to enable the requested cryptography strength, and the expiration date for the token. |

It is noted that the token may be implemented using other types of data structures instead of the X.509 certificate. Essentially any type of signed data structure that identifies the issuer (i.e., the cryptographic product provider) and allows the inclusion of additional data may be used. There must be a means to uniquely identify the token in the data such as a serial number to enable the issuing authority to subsequently identify the token for revocation purposes.

At step 142 in FIG. 5, the cryptographic product provider 22 digitally signs the token 42 using its private signing key $K_{CP\_pri}$. The cryptographic product provider 22 then returns the signed token 42 to the certifying authority 24 (step 144). Again, this step may involve encryption to securely pass the token back to the certifying authority 24. Key information included in the token 42 are the hash digest of the CA identity certificate, the capabilities to enable the cryptography strength being granted to the certifying authority, the expiration date of the token, the token's serial number, and the cryptographic product provider's ID.

At step 146 in FIG. 5, the certifying authority 24 verifies the product provider's signature using the provider's public signing key $K_{CP\_pub}$. The certifying authority then stores the token 42 in a local and secure manner for later issuance to authorized users (step 148).

Phase III: Issuance

Figure 6:
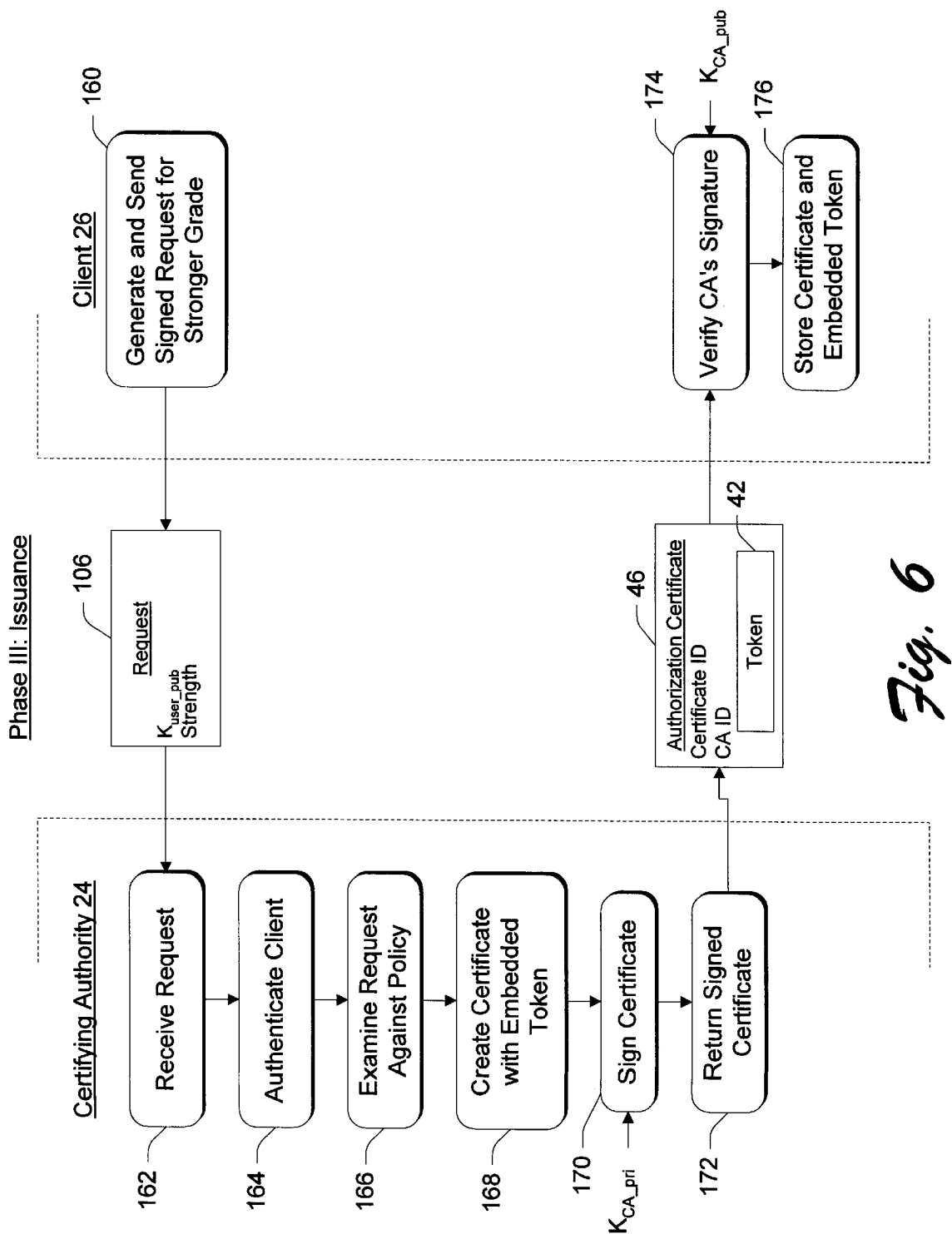
FIG. 6 is a flow diagram showing steps in a method for issuing a certificate to a user to expose the stronger cryptography.

FIG. 6 shows steps in a method for issuing capabilities for enabling higher strength cryptography from the certifying authority to a specific user or client computer 26. This method involves issuing a second certificate to the user that is signed by the certifying authority. The second certificate contains the token/first certificate issued by the cryptographic product provider 22. Most of the steps are implemented in software executing on a server at the certifying authority 24 and software executing at the client 26.

At step 160 in FIG. 6, the client 26 generates and sends a request 44 for stronger cryptography to the certifying authority 24. The request 44 contains the client's public key $K_{user\_pub}$ and the strength of cryptography being sought (e.g., 128-bit). The request 44 is transmitted over a network, such as a corporate LAN (local area network). If the network is not secure, the client may encrypt and sign the request.

The certifying authority 24 receives the request (step 162 in FIG. 6) and authenticates the client 26 as a legitimate machine (step 164). The certifying authority examines the request against its policy on issuing certificates for higher strength cryptography (step 166). For instance, the certifying authority 24 might determine whether the client resides within the United States or can properly use the extra strength cryptography in a foreign location. The CA 24 may also want to know the purpose for which the extra strength cryptography is to be used. The certifying authority 24 also determines whether it has authority to permit use of the requested strength. That is, the certifying authority 24 should first have a valid, non-expired token from the product provider before it can issue strength upgrades to the client 26. The policy can be made as strict or as lenient as a company desires, so long as it complies with the U.S. and other international laws regarding exportation of cryptographic materials.

If the client is permitted to upgrade the cryptography strength, the certifying authority 24 creates a certificate (step 168 in FIG. 6). The certificate is preferably an X.509 certificate with the token embedded in the extension field. Table 2 shows the structure of the certificate 46 when implemented as an X.509 certificate.

TABLE 2

Certificate Structure

| Field | Function |
| --- | --- |
| Version | Identifies the certificate format. |
| Serial Number | Unique identifier assigned to certificate. |
| Algorithm ID | Identifies the type of algorithm used to sign the certificate, together with any parameters. |
| Issuer | Name of certifying authority. |
| Period of Validity | Specifies a pair of dates, between which the certificate is valid. |
| Subject | Name of client. |
| Subject's Public Key | Specifies a cryptography algorithm, parameters used in the algorithm, and the client's public key. |
| Signature | Certifying authority's signature. |
| Extension | Holds the token issued and signed by the cryptographic product provider. |

At step 170 in FIG. 6, the certifying authority 24 digitally signs the certificate 46 using its private signing key $K_{CA\_pri}$. The certifying authority 24 then returns the signed certificate 46, with embedded token 42, to the client 24 (step 172). Key information included in the certificate 46 are the certificate ID or serial number, the certifying authority's ID, and the token 42.

At step 174 in FIG. 6, the client 26 verifies the CA's signature using the CA's public signing key $K_{CAP\_pub}$. The client 26 stores the certificate 46 and the token 42 in a local and secure memory for later use (step 176).

It is noted that the tokens may be passed through many intermediate certifying authorities before being issued to the ultimate user. In a corporate environment, for instance, the product provider may grant a token to a primary corporate server (e.g., a server located in the main U.S. headquarters) that acts as a root for an authorization chain. From this root server, the administrator issues the token to various nodes, such as different subsidiaries of the corporation. The administrator might issue a certificate to a subsidiary in the U.S. and other certificates to subsidiaries overseas. From this level, the certificates with embedded tokens may be passed to individual divisions within the subsidiaries, and so on. Finally, the certificates are issued to individual clients for use. The advantage to employing certificates for both the tokens themselves and the mechanisms for carrying the tokens is that the chain of authority may be easily traced back through each intermediate certifying authority to the root certifying authority and ultimately the product provider.

Phase IV: Use

Figure 7:
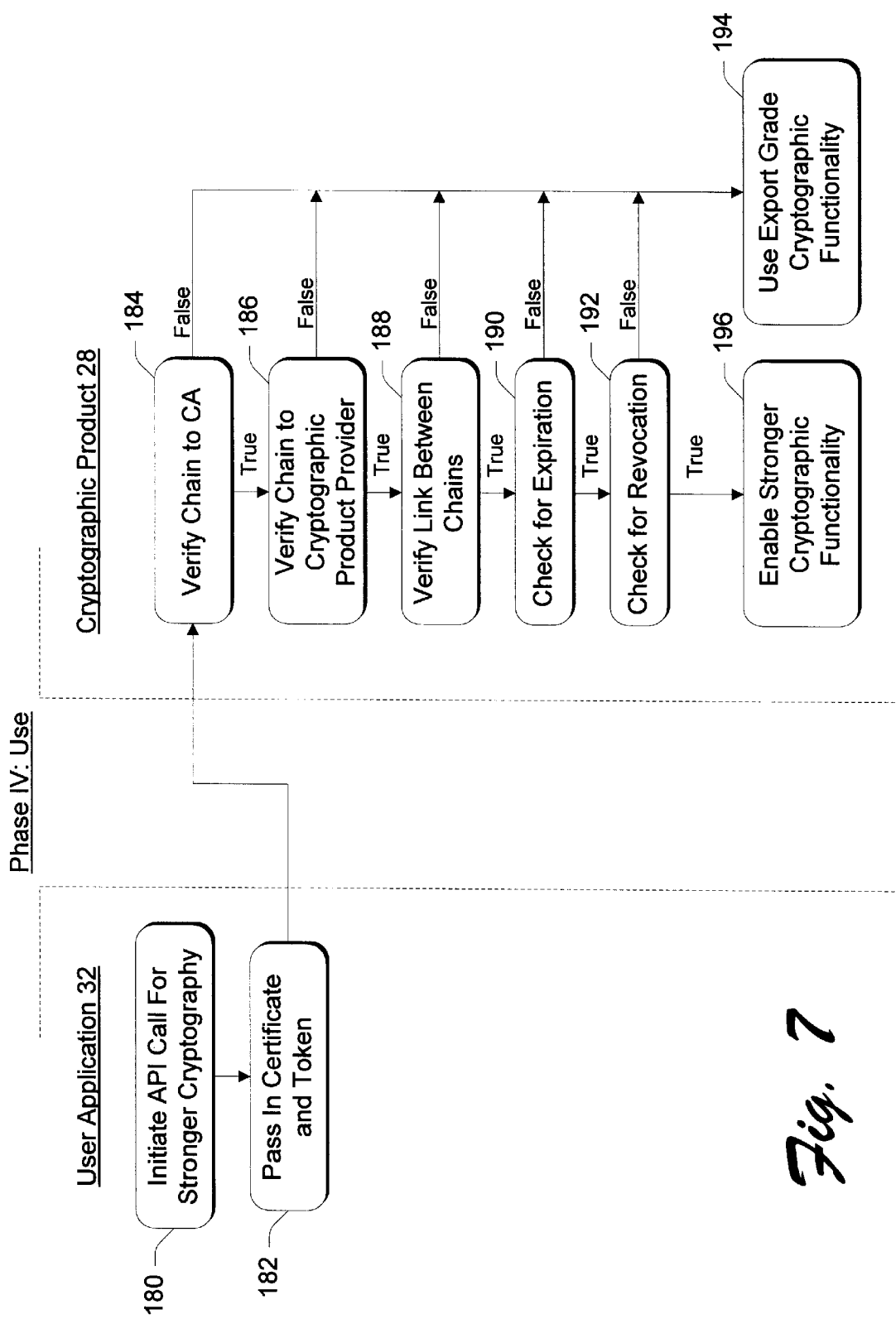
FIG. 7 is a flow diagram showing steps in a method for utilizing the stronger cryptography.

FIG. 7 shows steps in a method for using the capabilities to enable higher strength cryptography at the client 26. This method involves passing the certificate and token into the cryptographic product 28 to expose the higher strength cryptography functionality. The steps in this method are implemented in software executing at the client 26.

At step 180 in FIG. 7, a user application 32 running at the client 26 initiates a call via the API 34 requesting stronger cryptography. As an example, the user application 32 might be a personal finance application program that requests a 128-bit cipher 38. The user application 32 retrieves the certificate 46 and token 42 from memory and passes them in as parameters in the function call (step 182).

The cryptographic services 30 of the product 28 use the certificate 46 and token 42 to make several verifications. First, the cryptographic service 30 traces an authentication chain contained in the certificate to the root certifying authority (step 184). In this case, the service 30 establishes that the certificate 46 was issued is and signed by the certifying authority 24, which is recognized by the service 30 as a valid and authentic authority. In a second verification process, the cryptographic service 30 examines the token to verify whether it originated from the product provider 22 and has not be subsequently altered (step 186).

In a third verification process, the cryptographic service 30 verifies the link between the authentication chain to the certifying authority and the authentication chain to the product provider (step 188). The cryptographic service 30 evaluates the hash digest contained in the token 42 to determine whether the digest is for one of the certifying authorities in the certificate's authorization chain. In the example of one certifying authority, the cryptographic service provider 30 computes a hash digest of the CA's identity certificate using the same hashing function H and compares the result with the hash digest contained in the token 42. If they match, a link is positively established.

At step 190, the cryptographic service 30 checks the expiration dates of the token 42 and certificate 46. The certificate and token are approved if they have not yet been expired.

At step 192 in FIG. 7, the cryptographic service 30 examines the ID of the token 42 against a certificate revocation list (CRL) to determine whether the token has been revoked. The product provider occasionally publishes the CRL with all token IDs that have been revoked (e.g., once a day or once a week). The token is considered valid if it is within its validity period and its serial number has not been published on the currently valid CRL.

If any one of the checks in steps 184 to 192 return false, the cryptographic service 30 denies the request for higher strength cryptography and continues to expose only the export grade functionality (step 194). Conversely, if all checks in steps 184 to 192 return true, the cryptographic service 30 grants the request for higher strength cryptography and exposes the stronger grade functionality (step 196). In this example, the cryptographic service 30 exposes the 128-bit cipher 38.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A method for enabling multiple cryptography strengths in a cryptographic product supplied by a product provider, comprising the following steps:

exposing a first cryptography strength in the cryptographic product;

obtaining a certificate from a certifying authority to use a second cryptography strength in the cryptographic product, the certificate containing a token from the product provider with capabilities to enable the second cryptography strength and information for verifying that the token was granted to the certifying authority; and exposing the second cryptography strength in the cryptographic product with assistance from the capabilities included in the certificate.

2. A method as recited in claim 1 further comprising the following steps: verifying that the certificate originated from the certifying authority; verifying that the capabilities originated from the product provider; and verifying that the capabilities were granted to the certifying authority.

3. A method as recited in claim 1 further comprising the step of determining whether the certificate has been revoked.

4. A method as recited in claim 1, further comprising the step of determining whether the certificate has expired.

5. A method for enabling high strength cryptography in a cryptographic product supplied by a product provider, the cryptographic product being installed on a client and initially exposing a low strength cryptography without exposing the high strength cryptography, the method comprising the following steps:

(A) performing a registration phase between a certifying authority and the product provider, comprising the following steps:

submitting a request from the certifying authority to the product provider, the request containing an identity certificate of the certifying authority and a desired cryptography strength;

verifying, at the product provider, an authenticity of the certifying authority;

computing, at the product provider, a hash digest of the identity certificate;

creating, at the product provider, a token containing the hash digest of the identity certificate and capabilities to enable the desired cryptography strength;

transferring the token from the product provider to the certifying authority;

(B) performing an issuance phase between the certifying authority and the client, comprising the following steps:

submitting a request from the client to the certifying authority, the request containing an identity of the client and a particular cryptography strength;

verifying, at the certifying authority, an authenticity of the client;

evaluating, at the certifying authority, whether the client may be granted the particular cryptography strength;

creating, at the certifying authority, an authorization certificate that contains an identity of the certifying authority;

including the token with the authorization certificate;

transferring the authorization certificate and the token from the certifying authority to the client;

(C) performing a use phase at the client, comprising the following steps:

verifying that the authorization certificate originated from the certifying authority;

verifying that the token originated from the product provider;

verifying that the token contains the hash digest of the certifying authority's identity certificate; and if the verifying steps in step (C) return true, utilizing the capabilities contained in the token to expose the high strength cryptography in the cryptographic product.

6. A method as recited in claim 5, wherein the step (C) further comprises the step of determining whether at least one of the token or the authorization certificate has been revoked by the product provider.

7. A method as recited in claim 5, wherein the step (C) further comprises the step of determining whether at least one of the token or the authorization certificate has expired.

8. Computer-readable media distributed at the product provider, the certifying authority, and the client comprising computer-executable instructions for performing the steps recited in claim 5.

9. A method for upgrading a cryptographic product installed on a client computer from using low strength cryptography to using high strength cryptography, comprising the following steps:

obtaining a signed token from a provider of the cryptographic product, the token containing capabilities to expose the high strength cryptography and an identity of a particular certifying authority to which the token is issued;

generating a certificate containing the identity of the certifyng authority;

embedding the signed token within the certificate; and transferring the certificate with embedded token to the client computer.

10. A method as recited in claim 9, further comprising the step of utilizing the capabilities contained in the signed token to expose the higher strength cryptography in the cryptographic product.

11. A method as recited in claim 9, further comprising the following steps:

verifying that the certificate originated from the certifying authority;

verifying that the token originated from the product provider; and verifying that the signed token contains the identity of the certifying authority.

12. A method as recited in claim 9, further comprising the step of determining at least one of whether the signed token has been revoked by the product provider or whether the certificate has been revoked by the certifying authority.

13. A method as recited in claim 9, further comprising the step of determining whether at least one of the signed token or certificate has expired.

14. A computer programmed to perform the steps of the method recited in claim 9.

15. A computer-readable media having computer-executable instructions for performing the steps of the method recited in claim 9.

16. In a cryptographic product that is capable of employing varying strength cryptography including at least low and high strength cryptography, a method for exposing the high strength cryptography comprising the following steps:

initially exposing the low strength cryptography without exposing the high strength cryptography;

receiving a certificate from a certifying authority, the certificate carrying a token granted by a provider of the cryptographic product, the token containing capabilities to expose the higher strength cryptography in the cryptographic product and an identity of the certifying authority;

verifying that the certificate originated from the certifying authority;

verifying that the token originated from the product provider;

verifying that the token contains the identity of the certifying authority; and if the verifying steps return true, utilizing the capabilities contained in the token to expose the high strength cryptography in the cryptographic product.

17. A method as recited in claim 16, further comprising the step of determining whether at least one of the token or certificate has been revoked by the product provider.

18. A method as recited in claim 16, further comprising the step of determining whether at least one of the token or certificate has expired.

19. A computer programmed to perform the steps of the method recited in claim 16.

20. A computer-readable media having computer-executable instructions for performing the steps of the method recited in claim 16.

21. A system comprising:

a client;

at least one cryptographic-based product installed on the client, the product being capable of using multiple strength cryptography including at least low and high strength cryptography, the product initially exposing the low strength cryptography without exposing the high strength cryptography;

a server located at a certifying authority separate from the client;

the client being configured to submit a request to the server for authorization to expose the high strength cryptography;

the server being configured to generate an authorization certificate in response to the request, the authorization certificate containing an identity of the certifying authority and a token from a provider of the cryptographic-based product, the token containing capabilities to expose the higher strength cryptography in the cryptographic product and an encoded identity of the certifying authority, the server passing the authorization certificate and the token to the client; and the cryptographic-based product being configured to verify an authenticity of the authorization certificate and an authenticity of the token, and to expose the high strength cryptography using the capabilities contained in the token.

22. A system as recited in claim 21, wherein the token is embodied as a digital certificate that is attached to the authorization certificate.

23. A system as recited in claim 21, wherein the cryptographic-based product uses the encoded identity of the certifying authority in the token to verify that the token was issued to the certifying authority.

24. A system as recited in claim 21, wherein the cryptographic-based product determines, prior to exposing the high strength cryptography, whether one of the authorization certificate or the token has been revoked.

25. A system as recited in claim 21, wherein the cryptographic-based product determines, prior to exposing the high strength cryptography, whether one 19 of the authorization certificate or the token has expired.

26. A data structure embodied on a computer-readable medium, comprising:

an issuer field to hold an identity of a certifying authority that issues a digital certificate for enabling a cryptographic product to expose one or more strengths of cryptography;

a subject field to hold an identity of a client to which the digital certificate is issued; and an extension field to hold a digital token issued by a provider of the cryptographic product, the token containing capabilities to expose the one or more strengths of cryptography in the cryptographic product and an encoded identity of the certifying authority.

27. A data structure as recited in claim 26, wherein the token is embodied as a second digital certificate.

28. A data structure as recited in claim 26, further comprising a period of validity field to hold information indicating when the certificate is valid.

29. In a cryptographic product that is capable of employing varying strength cryptography including at least low and high strength cryptography, a method for exposing the high strength cryptography comprising the following steps:

receiving a certificate from a certifying authority, the certificate carrying a token granted by a provider of the cryptographic product, the token containing capabilities to expose the higher strength cryptography in the cryptographic product and an identity of the certifying authority; and utilizing the capabilities contained in the token to expose the high strength cryptography in the cryptographic product.

30. A method as recited in claim 29, further comprising determining whether at least one of the token or the certificate has been revoked by the product provider.

31. A method as recited in claim 29, further comprising determining whether at least one of the token or the certificate has expired.

32. A computer programmed to perform the steps of the method recited in claim 29.

33. A computer-readable media having computer-executable instructions for performing the steps of the method recited in claim 29.

34. A system comprising:

a computer;

at least one cryptographic-based product installed on the computer, the product being capable of using multiple strength cryptography including at least low and high strength cryptography, the product initially exposing the low strength cryptography without exposing the high strength cryptography;

the computer being configured to submit a request to a server for an authorization certificate to expose the high strength cryptography, the authorization certificate containing a token from a provider of the cryptographic-based product, the token containing capabilities to expose the higher strength cryptography in the cryptographic product; and the cryptographic-based product being configured to verify an authenticity of the authorization certificate and an authenticity of the token and to expose the high strength cryptography using the capabilities contained in the token.

35. A system as recited in claim 34, wherein the token is embodied as a digital certificate that is attached to the authorization certificate.

36. A system as recited in claim 34, wherein the token also contains an encoded identity of the certifying authority and the cryptographic-based product uses the encoded identity of the certifng authority in the token to verify that the token was issued to the certifying authority.

37. A system as recited in claim 34, wherein the cryptographic-based product determines, prior to exposing the high strength cryptography, whether one of the authorization certificate or the token has been revoked.

38. A system as recited in claim 34, wherein the cryptographic-based product determines, prior to exposing the high strength cryptography, whether one of the authorization certificate or the token has expired.

39. A system comprising:

a computer; and a server installed on the computer to generate an authorization certificate in response to a request from a client with a cryptographic-based product, the authorization certificate containing an identity of a certifying authority and a token from a provider of the cryptographic-based product, the token containing capabilities to expose higher strength cryptography in the cryptographic product and an encoded identity of the certifying authority, the server passing the authorization certificate and the token to the client.

40. A system for upgrading a cryptographic product installed on a client computer from using low strength cryptography to using high strength cryptography, comprising:

means for obtaining a signed token from a provider of the cryptographic product, the token containing capabilities to expose the high strength cryptography and an identity of a particular certifying authority to which the token is issued;

means for generating a certificate containing the identity of the certifying authority;

means for embedding the signed token within the certificate; and means for transferring the certificate with embedded token to the client computer.

* * * * *

UNITED STATES PATENT AND TRADEMARK OFFICE
CERTIFICATE OF CORRECTION

PATENT NO. : 6,308,266 B1
DATED : October 23, 2001
INVENTOR(S) : Trevor W. Freeman It is certified that error appears in the above-identified patent and that said Letters Patent is hereby corrected as shown below:

Column 10,
Line 29, delete "is" after "issued".

Column 14,
Line 3, delete "19" after "one".

Column 15,
Line 7, replace "certifng" with -- certifying --.

Signed and Sealed this

Nineteenth Day of March, 2002

Attest:

JAMES E. ROGAN
*Attesting Officer*   *Director of the United States Patent and Trademark Office*